United States Patent
Tolfsen

[11] 4,052,772
[45] Oct. 11, 1977

[54] PILLAR LOOP FOR BELTS, SUCH AS SEAT BELTS IN CARS OR THE LIKE

[75] Inventor: Ulf Tolfsen, Gralum, Norway

[73] Assignee: Loyo's Indistri A/S, Fredrikstad, Norway

[21] Appl. No.: 639,171

[22] Filed: Dec. 9, 1975

[30] Foreign Application Priority Data

May 20, 1975 Norway .................. 1778/75

[51] Int. Cl.² ............................................. A44B 11/00
[52] U.S. Cl. ................................. 24/163 FC; 24/182; 24/265 R
[58] Field of Search ............... 24/115 K, 182, 163, 24/265, 197, 198; 403/209, 211, 212, 215; 297/384 T

[56] References Cited

U.S. PATENT DOCUMENTS

| 234,888 | 11/1880 | Neider | 24/182 X |
|---|---|---|---|
| 320,728 | 6/1885 | Wales | 24/182 X |
| 2,644,776 | 7/1953 | Williams et al. | 24/163 FL |
| 3,111,060 | 11/1963 | Peeling | 403/209 XA |
| 3,902,227 | 9/1975 | Sherwood | 24/115 J |

FOREIGN PATENT DOCUMENTS

| 453,143 | 5/1913 | France | 24/265 AL |

*Primary Examiner*—Paul R. Gilliam
*Assistant Examiner*—Donald Griffin
*Attorney, Agent, or Firm*—Haseltine, Lake & Waters

[57] ABSTRACT

A pillar loop for belts, such as seat belts in cars or the like, and particularly the type of pillar loop which is secured to a vehicle and having a belt extending therethrough for guidance of the latter. The pillar loop is of round steel which can be constructed in a simplified manner in comparison with known methods. As mentioned above, it has heretofore been necessary to use plate material for securing pillar loops which are made of round steel, for instance, to a car wall.

4 Claims, 5 Drawing Figures

PILLAR LOOP FOR BELTS, SUCH AS SEAT BELTS IN CARS OR THE LIKE

FIELD OF THE INVENTION

The present invention relates to a pillar loop for belts, such as seat belts in cars or the like, and particularly the type of pillar loop which is secured to a vehicle and having a belt extending therethrough for guidance of the latter.

DISCUSSION OF THE PRIOR ART

Various kinds of pillar loops for automatic seat belts in cars are presently known, of which FIGS. 1 through 4 of the drawings illustrate conventional types. In these pillar loops the round hole 1 serves to secure the pillar loop to the vehicle, whereas the slot shaped recess 2 serves to guide the belt. FIG. 2 shows a pillar loop of the same type as that in FIG. 1, but modified so as to be provided with a cover having a somewhat rounded surface. Thus, sharp edges are avoided in the contact area between the pillar loop and the belt, while concurrently the contact area is somewhat enlarged. FIG. 3 shows a pillar loop blanked or stamped out of a somewhat thicker steel plate than is used for blanking out the pillar loop according to FIGS. 1 or 2. The pillar loop according to FIG. 3 is die-forged and the portion over which the belt slides is round-forged. FIG. 4 shows a pillar loop which is constructed of a round steel loop secured to a steel plate, with the end portions of the loop being bent together. The steel plate is necessary in order to secure the pillar loop to the vehicle.

Upon the occurrence of an extreme dynamic stress; the seat belt of a car is exposed to a shock-like stress, whereby the belt will tend to break or fissure in the area of contact with the pillar loop.

SUMMARY OF THE INVENTION

The present invention provides for a novel pillar loop which is based on the concept that it is essential to reduce the shock-like stress to which, for instance, seat belts in cars may in certain cases be exposed and which will generally result in the breakage of the seat belt. The present invention is also predicated on the concept that the portion of the pillar loop over which there runs the seat belt, should have a round shape and, preferably consist of round steel.

Accordingly, it is an object of the present invention to provide a pillar loop which incorporates a shock absorbing effect when exposed to a shock-like stress. For this reason the pillar loop should slightly yield when exposed to a shock-like stress.

A further object of the invention is to provide a pillar loop of round steel which can be constructed in a simplified manner in comparison with known methods. As mentioned above, it has heretofore been necessary to use plate material for securing pillar loops which are made of round steel, for instance, tó a car wall.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

The prior art pillar loop constructions shown in FIG. 1 through 4 of the drawings have been discussed hereinbefore and, accordingly, no further detailed descriptions thereof are required for an understanding of the invention.

Figure 1:
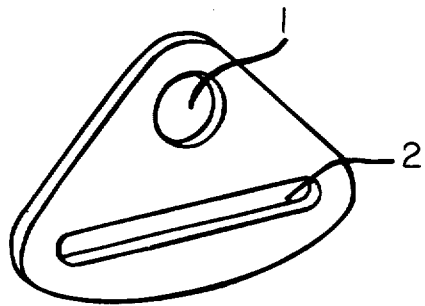
FIGS. 1 through 4 respectively show perspective views of various prior art embodiments of pillar loops.
Figure 2:
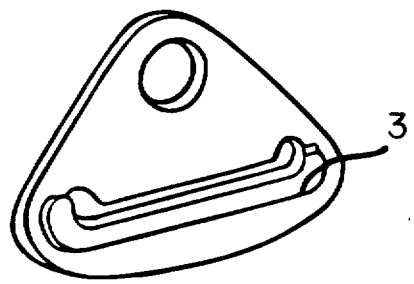
Figure 3:
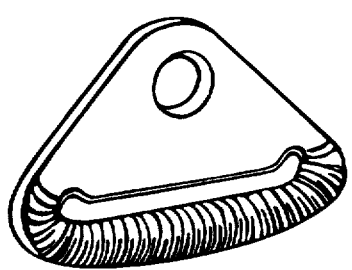
Figure 4:
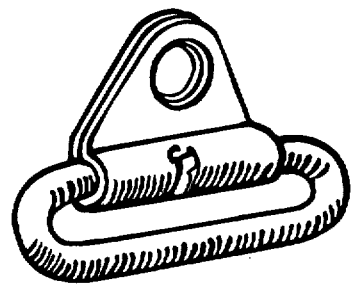
Figure 5:
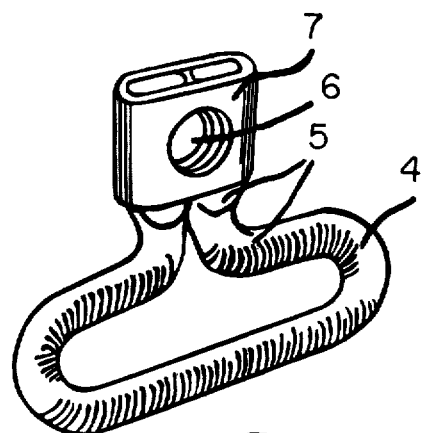
FIG. 5 shows a perspective view of a pillar loop constructed pursuant to the present invention.
Figure 6:
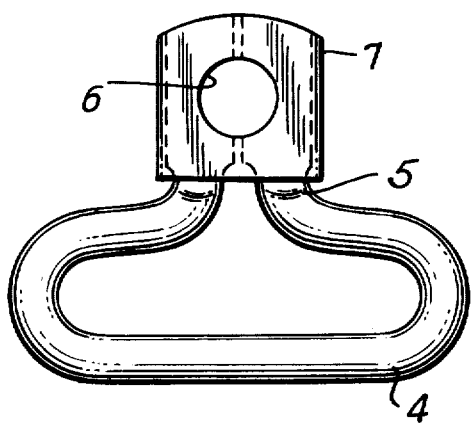
FIG. 6 shows an elevation view of FIG. 5.
Figure 7:
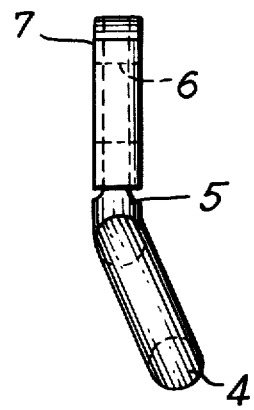
FIG. 7 shows a sideview of FIG. 6.
Figure 8:
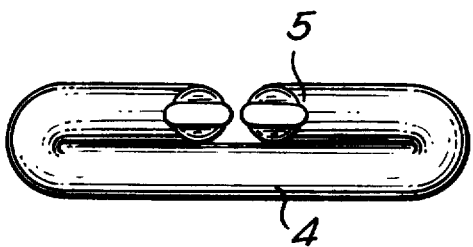
FIG. 8 shows a plan view of FIG. 6 with the tube 7 removed.

The pillar loop according to the invention is disclosed in FIG. 5 and is characterized in that the loop 4 consists of round or bar steel, the end portions of which are bent towards one another and are then bent in an angle of 90°, so as to extend in a parallel and adjacent relationship. The end portions are secured in that positon and are provided with a hole 6 for the attachment of the pillar loop; and wherein the end portions, if desired, are then flattened. FIG. 6 shows an elevational view of FIG. 5, FIG. 7 showing a sideview of FIG. 6. FIG. 8 shows a plan view of FIG. 5 with the tube 7 removed.

According to a preferred embodiment of the invention, the end portions are flattened and secured in that position through the aid of a tube 7 which is similarly flattened and provided with a hole enveloping the end portions. It is to be understood, however, that the round steel end portions can be secured in a parallel and adjacent position in several different ways, such as by enveloping the end portions with a suitable steel plate, or by welding them firmly together.

In a preferred embodiment of the invention, the loop itself is somewhat bent or twisted relative to the remaining portion of the pillar loop, so that the loop is somewhat inclined from the wall to which the pillar loop has been secured, such as a car wall.

In a further preferred embodiment, the pillar loop is provided with a plastic cover which guides the belt as well as it forms a covering, for example, for the nut head and other sharp and projecting elements.

Stress tests carried out with the known pillar loops show that they do not change their shape to any appreciable degree when exposed to great stress. Stress tests carried out with the pillar loop according to the present invention, on the other hand, show that the pillar loop is somewhat resilient when exposed to great stress, i.e., it yields to some degree in the direction of the applied force. This property of the pillar loop according to the present invention due to the special construction and shape of the pillar loop. In contrast with conventional pillar loops, the pillar loop according to the invention, thus has a shock-absorbing effect.

The pillar loop according to the present invention can also be produced in a simplified manner in comparison with the previously known pillar loops which are formed of round steel, where the loop of round steel is secured to a plate member.

The plate is necessary for attaching the pillar loop to a structure, such as a car wall. However, with the pillar loop according to the present invention it is not necessary to attach the round steel loop to any plate member, since the end portions of the pillar loop which are provided with a hole, in this case serve to secure the pillar loop to the vehicle. The end portions which are flattened according to a preferred embodiment according to the invention must only be secured in their relative position in some manner, for instance, by sliding a flattened tube member of a suitable size and provided with holes over the flattened end portions of the pillar loop, or by enveloping that end portions by a plate member, or by welding the end portions together, and so forth. With the pillar loop according to the present invention there is obtained a product which can be produced in a simplified manner as contrasted with previously known pillar loops which are formed of round steel.

While there has been shown what is considered to be the preferred embodiment of the invention, it will be obvious that modifications may be made which come within the scope of the disclosure of the specification.

What is claimed is:

1. In a pillar loop for belts, such as for seat belts in cars and the like, said pillar loop being securable to a vehicle for guiding a belt extending through a portion of said pillar loop, the improvement wherein said pillar loop is formed of a length of round steel bent into a loop through which a belt is adapted to be passed, said length of round steel having end portions bent towards one another in an angle of 90° so that said end portions extend in a parallel and adjacent relationship, and further comprising means for securing said end portions in the parallel and adjacent relationship including an at least partially flattened tube having a hole formed therein, said hole serving for the attachment of said pillar loop, the pillar loop portion for guiding said belt being slightly bent and twisted relative to the remaining portion of said pillar loop, for said pillar loop to be securable in a somewhat inclined position relative to a surface of the vehicle 2. A pillar loop as claimed in claim 1, wherein said end portions are flattened.

3. A pillar loop as claimed in claim 1, further comprising a plastic cover for said pillar loop.

4. A pillar loop as claimed in claim 1, wherein said pillar loop is at least partially stress-resilient in the direction of an applied force.

* * * * *